(12) United States Patent
Ide et al.

(10) Patent No.: US 7,531,053 B2
(45) Date of Patent: May 12, 2009

(54) FUEL CELL PRODUCED USING A METALLIC MATERIAL AND ITS METHOD OF MAKING

(75) Inventors: Shinsuki Ide, Chiyoda-ku (JP); Shin Ishikawa, Chiyoda-ku (JP); Kenji Takao, Chiyoda-ku (JP); Osamu Furukimi, Chiyoda-ku (JP); Kunio Fukuda, Chiyoda-ku (JP); Atsushi Miyazaki, Chiyoda-ku (JP)

(73) Assignee: JFE Steel Corporation (JP)

( * ) Notice: Subject to any disclaimer, the term of this patent is extended or adjusted under 35 U.S.C. 154(b) by 195 days.

(21) Appl. No.: 10/509,469

(22) PCT Filed: Aug. 7, 2003

(86) PCT No.: PCT/JP03/10060

§ 371 (c)(1),
(2), (4) Date: Sep. 28, 2004

(87) PCT Pub. No.: WO2004/015156

PCT Pub. Date: Feb. 19, 2004

(65) Prior Publication Data

US 2005/0076976 A1    Apr. 14, 2005

(30) Foreign Application Priority Data

Aug. 9, 2002    (JP) .............................. 2002-232367

(51) Int. Cl.
*C22C 38/22*    (2006.01)
*C22C 38/26*    (2006.01)
*C21D 8/00*    (2006.01)

(52) U.S. Cl. ................. 148/326; 148/325; 148/651; 148/653; 148/608; 420/40; 420/69

(58) Field of Classification Search ............... 148/326, 148/325, 651, 653, 608; 420/40, 69
See application file for complete search history.

(56) References Cited

U.S. PATENT DOCUMENTS 4,010,049 A    3/1977    Rarey et al.
6,641,780 B2 *  11/2003    Grubb ..................... 420/68

FOREIGN PATENT DOCUMENTS

EP         1176220 A1    1/2002

(Continued)

*Primary Examiner*—Deborah Yee
(74) *Attorney, Agent, or Firm*—DLA Piper LLP (US)

(57) ABSTRACT

An inexpensive metallic material for interconnects of solid-oxide fuel cells, a fuel cell using the metallic material, and a method for producing the metallic material having excellent oxidation resistance and spalling resistance of an oxide layer, high electrical conductivity, and a small difference in thermal expansion from an electrolyte. Specifically, 0.20 percent by mass or less of C, 0.02 to 1.0 percent by mass of Si, 2.0 percent by mass or less of Mn, 10 to 40 percent by mass of Cr, 0.03 to 5.0 percent by mass of Mo, 0.1 to 3.0 percent by mass of Nb, and at least one element selected from the group consisting of Sc, Y, La, Ce, Pr, Nd, Pm, Sm, Zr, and Hf in a total of 1.0 percent by mass or less are added so as to satisfy $0.1 \leq Mo/Nb \leq 30$, for decreasing the growth rate of the oxide layer and improving the spalling resistance.

12 Claims, 2 Drawing Sheets

FOREIGN PATENT DOCUMENTS

| | | |
|---|---|---|
| EP | 1 207 214 A2 | 5/2002 |
| JP | 07145453 | 6/1995 |
| JP | 08060306 | 3/1996 |
| JP | 08127847 | 5/1996 |
| JP | 408199235 * | 8/1996 |
| JP | 9-157801 A | 6/1997 |
| JP | 10-237600 A | 9/1998 |
| JP | 10251808 | 9/1998 |
| JP | 10-280103 A | 10/1998 |
| JP | 10280103 | 10/1998 |
| JP | 2000096193 | 4/2000 |
| WO | WO 03/48402 A1 | 6/2003 |

* cited by examiner

FUEL CELL PRODUCED USING A METALLIC MATERIAL AND ITS METHOD OF MAKING

TECHNICAL FIELD

The technology in the disclosure relates to a metallic material for solid-oxide fuel cells. Particularly, it relates to a metallic material (Fe—Cr alloy material) for interconnects of solid-oxide fuel cells having oxidation resistance in use at high temperatures and electrical conductivity, a fuel cell using the metallic material, and a method for producing the metallic material. The metallic material of the present invention can also be applied to peripheral members of the solid-oxide fuel cells required to have oxidation resistance, other fuel cells, and heat exchangers, reforming devices, and the like.

BACKGROUND ART

A fuel cell discharges small amounts of harmful gases and has a high efficiency of power generation, and it is thus expected that a fuel cell is applied to a wide variety of generation systems such as large-scale power generation, a cogeneration system, an automobile power source, and the like. Particularly, a solid-oxide fuel cell (referred to as a solid-electrolyte fuel cell) operates at 700° C. to 1000° C., and has the characteristics that a catalyst need not be used for an electrode reaction, various fuel gases such as a coal reformed gas, and the like can be used, the fuel cell can be combined with a gas turbine or steam turbine by using high-temperature exhaust heat. Therefore, fuel cells attract attention as an energy source for the next generation.

Figure 1:
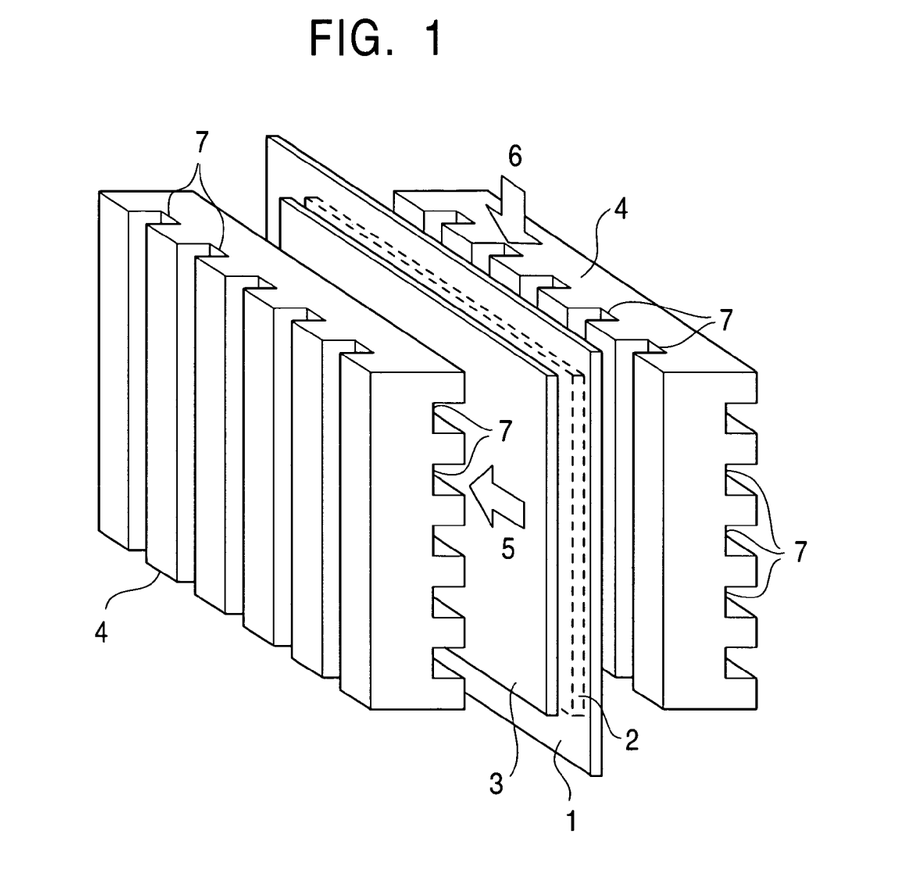
FIG. 1 is a drawing schematically showing an example of the structure of a solid-oxide fuel cell.

As shown in FIG. 1, an example of the solid-oxide fuel cells comprises an electrolyte 1, electrodes 2 and 3, and interconnects 4 (referred to as "separators"), the electrolyte 1 generally comprising an ionic conductive solid electrolyte such as yttria stabilized zirconia (YSZ) or the like. The cathode (air-electrode) 2 composed of $(La,Sr)MnO_3$, or the like and the anode (fuel-electrode) 3 composed of Ni/YSZ (cermet of Ni/yttria stabilized zirconia (YSZ)) or the like are attached to both surfaces of the electrolyte 1 so that the electrolyte 1 functions as a partition, a fuel gas 5 such as hydrogen gas is supplied to one of both sides of the electrolyte 1, and an oxidizing gas 6 such as air or the like is supplied to the other side to take out electricity. The interconnects 4, comprising 3 layers of the electrolyte 1 and the electrodes 2 and 3, have the function to support an electrolyte-electrode assembly, form gas channels 7 and pass a current.

At present, the solid-oxide fuel cells have many problems of practical use remaining unsolved. Particularly, the interconnects 4, which are important components, have many problems. This is because the interconnects are used at a high temperature near 1000° C., for example, 700° C. to 900° C., and thus the interconnects are required to have properties such as oxidation resistance, electrical conductivity, and a small difference in thermal expansion from the electrolyte.

As a material satisfying these requirements, conductive ceramics such as $(La,Sr)CrO_3$, and the like are conventionally used. However, ceramics have low workability and are expensive, and thus ceramics have problems from the viewpoint of increase in size and practical use of fuel cells. Therefore, the development of an interconnect has been progressed by using an inexpensive metal material having high reliability as an alternative material.

In the use of a metallic material at a high temperature, the surface is oxidized to form an oxide layer thereon. Therefore, in order to use such a metallic material for interconnects, it is necessary that the oxide layer slowly grows and does not peel, and the oxide layer has electrical conductivity. Namely, it is necessary that the oxide layer has both the high-temperature oxidation resistance and electrical conductivity.

As a technique for satisfying these requirements, for example, Japanese Unexamined Patent Application Publication No. 6-264193 discloses austenitic stainless steel used as a metallic material for solid-oxide fuel cells, the austenitic stainless steel comprising 0.1 percent by mass or less of C, 0.5 to 3.0 percent by mass of Si, 3.0 percent by mass or less of Mn, 15 to 30 percent by mass of Cr, 20 to 60 percent by mass of Ni, 2.5 to 5.5 percent by mass of Al, and the balance substantially composed of Fe. However, the metallic material contains significant amounts of Al and Cr, and thus forms an oxide layer mainly composed of an Al oxide. As described below, an Al oxide has low electrical conductivity, and is thus unsuitable for use for interconnects of solid-oxide fuel cells. Since the austenitic stainless steel has a high thermal expansion coefficient (a thermal expansion coefficient of 16 to $20 \times 10^{-6}/°$ C. from 20° C. to 900° C.), as compared with that (a thermal expansion coefficient of 9 to $12 \times 10^{-6}/°$ C. from 20° C. to 900° C.) of the yttria stabilized zirconia of the electrolyte 1, the electrolyte or the electrodes are possibly cracked due to a difference in thermal expansion when the temperature changes at a start or stop. Also, 20 to 60 percent by mass of expensive Ni must be added.

Also, Japanese Unexamined Patent Application Publication No. 7-166301 discloses a technique for interconnects of solid-oxide fuel cells, in which an element (La, Y, Ce, or Al) is added to a material comprising 60 to 82 percent by mass of Fe and 18 to 40 percent by mass of Cr, for decreasing the contact resistance between an interconnect and an air-electrode (cathode) of an electrical cell. However, the interconnect material does not have oxidation resistance such as resistance to long-term use at high temperatures, thereby inevitably causing the problem of increasing the electrical resistance of the oxide layer.

Furthermore, Japanese Unexamined Patent Application Publication No. 7-145454 discloses a metallic material for solid-oxide fuel cells, the material comprising 5 to 30 percent by mass of Cr, 3 to 45 percent by mass of Co, 1 percent by mass or less of La, and the balance substantially composed of Fe. However, the material does not have a sufficient property from the viewpoint of oxidation resistance, particularly, a weight increase by oxidation.

Furthermore, Japanese Unexamined Patent Application Publication No. 9-157801 discloses a steel material for interconnects of solid-oxide fuel cells, the material comprising 0.2 percent by mass or less of C, 0.2 to 3.0 percent by mass of Si, 0.2 to 1.0 percent by mass of Mn, 15 to 30 percent by mass of Cr, 0.5 percent by mass or less of Y, 0.2 percent by mass or less of REM, 1 percent by mass or less of Zr, and the balance substantially composed of Fe. The amount of descaling of this material is evaluated for oxidation resistance. However, an increase in thickness of the oxide layer is not sufficiently inhibited, and thus the electrical resistance is inevitably increased by growth of the oxide layer. Also, the thermal expansion coefficient is not sufficiently decreased.

Furthermore, Japanese Unexamined Patent Application Publication No. 10-280103 discloses a steel material for interconnects of solid-oxide fuel cells, the material comprising 0.2 percent by mass or less of C, 3.0 percent by mass or less of Si, 1.0 percent by mass or less of Mn, 15 to 30 percent by mass of Cr, 0.5 percent by mass or less of Hf, and the balance substantially composed of Fe. Like the material disclosed in Japanese Unexamined Patent Application Publication No. 9-157801, the amount of descaling of this material is evaluated for oxidation resistance. However, an increase in thickness of the oxide layer is not sufficiently inhibited, and thus the electrical resistance is inevitably increased by growth of the oxide layer. Also, the thermal expansion coefficient is not sufficiently decreased.

As described above, any one of the conventional disclosed metallic materials does not necessarily have sufficient oxidation resistance and electrical conductivity for interconnects of solid-oxide fuel cells.

In a metallic material for interconnects of solid-oxide fuel cells used in an environment of 700° C. to 1000° C., particularly 700° C. to 900° C., a protective oxide layer must be formed for maintaining the oxidation resistance. However, an interconnect is a member required to have electrical conductivity, and thus the oxide layer must have electrical conductivity and must be thinned.

However, an Al oxide which forms an excellent protective layer has low electrical conductivity, and thus the formation of the oxide layer significantly deteriorates the performance of a cell due to an increase in the electrical resistance. Therefore, a material containing a large amount of Al cannot be used for interconnects. Even when a Fe—Cr alloy is used to form a Cr oxide layer having high electrical conductivity, the alloy cannot be used for interconnects unless the adhesion and the growth rate of the layer can be decreased. Namely, a Fe—Cr alloy to which only REM is added cannot be sufficiently used for interconnects.

It could therefore be advantageous to provide an inexpensive metallic material (Fe—Cr alloy) for interconnects of solid-oxide fuel cell, and a fuel cell using the metallic material, the metallic material having an excellent oxidation resistance at a high temperature of 700° C. to 900° C., i.e., a low oxidation rate, excellent spalling resistance of the formed oxide layer, high electrical conductivity, and a small difference in thermal expansion from an electrolyte.

SUMMARY

Interconnects of solid-oxide fuel cells are required to have a small difference in thermal expansion from yttria stabilized zirconia (YSZ) used as an electrolyte and to form a protective layer having excellent electrical conductivity. Therefore, for example, a ferritic metallic material which forms a protective layer mainly composed of $Cr_2O_3$ is regarded as promising. However, a Fe—Cr alloy material to which only REM is added has insufficient characteristics, and the oxidation resistance of the material must be further improved.

We carried out extensive study for solving the above problem with attention to the influence of the added elements on the oxidation resistance. As a result, it was found that the combined addition of Mo and Nb can significantly improve the oxidation resistance. The most important characteristic is that a large amount of intermetallic compound (one of precipitate) is precipitated in the grain boundaries of a base material in a long-term high-temperature operating environment, which is an operating environment of solid-oxide fuel cells, and the precipitate can control (suppress) diffusion of each element to improve the oxidation resistance. Namely, we found that although the single addition of Mo or Nb also causes precipitation of the intermetallic compound, the combined addition of both elements causes the precipitation of a large amount of the intermetallic compound in the grain boundaries of the base material to control (suppress) diffusion of each of elements such as Cr, Fe, Si, and the like, thereby significantly improving the oxidation resistance.

We further found that the problem characteristic of a Mo—Nb system, i.e., the problem of increasing the spalling amount of the oxide at a high temperature, can be prevented by adding Sc, Y, La, Ce, Pr, Nd, Pm, Sm, Zr, or Hf. Even when such an element is added, the formed oxide layer is mainly composed of $Cr_2O_3$, and thus electrical resistance is not much increased, thereby purely suppressing only a weight increase by oxidation and suppressing an increase in electrical resistance.

We provide a metallic material for fuel cells, comprising 0.20 percent by mass or less of C, 0.02 to 1.0 percent by mass of Si, 2.0 percent by mass or less of Mn, 10 to 40 percent by mass of Cr, 0.03 to 5.0 percent by mass of Mo, 0.1 to 3.0 percent by mass of Nb, at least one of element selection from Sc, Y, La, Ce, Pr, Nd, Pm, Sm, Zr, and Hf in a total of 1.0 percent by mass or less, and the balance composed of Fe and inevitable impurities, wherein $0.1 \leq Mo/Nb \leq 30$ is satisfied.

The metallic material for fuel cells further comprises a precipitate containing Fe, Cr and Si at contents on the basis of the metallic material satisfying the following equation (1):

$$[\text{precipitated Fe}]+[\text{precipitated Cr}]+[\text{precipitated Si}] \geq 0.01 \text{ percent by mass} \quad (1)$$

wherein,

[precipitated Fe]: content (percent by mass) of Fe in the precipitate;

[precipitated Cr]: content (percent by mass) of Cr in the precipitate; and

[precipitated Si]: content (percent by mass) of Si in the precipitate.

The total content of Fe, Cr and Si in the precipitate is preferably 0.03 percent by mass or more.

When the metallic material for fuel cells is used at a cell operating temperature of 800° C. for at least 1000 hours or more, the Fe, Cr and Si contents in the precipitate on the basis of the metallic material satisfy the following equation (2):

$$[\text{precipitated Fe}]+[\text{precipitated Cr}]+[\text{precipitated Si}] \geq 0.03 \text{ percent by mass} \quad (2)$$

wherein,

[precipitated Fe]: content (percent by mass) of Fe in the precipitate;

[precipitated Cr]: content (percent by mass) of Cr in the precipitate; and

[precipitated Si]: content (percent by mass) of Si in the precipitate.

The total content of Fe, Cr and Si in the precipitate is preferably 0.10 percent by mass or more.

The metallic material for fuel cells is a hot-rolled material or a cold-rolled material.

The metallic material for fuel cells may be further subjected to a precipitation treatment so that the Fe, Cr and Si contents in the precipitate on the basis of the metallic material satisfy the following equation (3):

$$[\text{precipitated Fe}]+[\text{precipitated Cr}]+[\text{precipitated Si}] \geq 0.02 \text{ percent by mass} \quad (3)$$

wherein,

[precipitated Fe]: content (percent by mass) of Fe in the precipitate;

[precipitated Cr]: content (percent by mass) of Cr in the precipitate; and

[precipitated Si]: content (percent by mass) of Si in the precipitate.

The total content of Fe, Cr and Si in the precipitate is preferably 0.05 percent by mass or more.

The metallic material for fuel cells is preferably a heat-resistant material for solid-oxide fuel cells, and more preferably a heat-resistant material for interconnects of solid-oxide fuel cells.

We also provide a solid-oxide fuel cell using the metallic material for fuel cells.

We further provide a method for producing a metallic material for fuel cells, the method comprising re-heating a steel material according demand, hot-rolling the steel material, and then annealing and picking the hot-rolled sheet according demand, wherein the steel material is adjusted to contain 0.20 percent by mass or less of C, 0.02 to 1.0 percent by mass of Si, 2.0 percent by mass or less of Mn, 10 to 40 percent by mass of Cr, 0.03 to 5.0 percent by mass of Mo, 0.1 to 3.0 percent by mass of Nb, at least one element selected from the group consisting of Sc, Y, La, Ce, Pr, Nd, Pm, Sm, Zr, and Hf in a total of 1.0 percent by mass or less, and the balance composed of Fe and inevitable impurities, and $0.1 \leq Mo/Nb \leq 30$ is satisfied.

In the method for producing a metallic material for fuel cells, the metallic material for fuel cells further comprises a precipitate containing Fe, Cr and Si at contents on the basis of the metallic material satisfying the following equation (1):

[precipitated Fe]+[precipitated Cr]+[precipitated Si]$\geq$0.01 percent by mass  (1)

wherein,

[precipitated Fe]: content (percent by mass) of Fe in the precipitate;

[precipitated Cr]: content (percent by mass) of Cr in the precipitate; and

[precipitated Si]: content (percent by mass) of Si in the precipitate.

The total content of Fe, Cr and Si in the precipitate is preferably 0.03 percent by mass or more.

The method for producing a metallic material for fuel cells further comprises cold-rolling or cold-rolling, annealing and then pickling.

The method for producing a metallic material for fuel cells further comprises performing a precipitation treatment of the metallic material for fuel cells so that the Fe, Cr and Si contents in the precipitate on the basis of the metallic material satisfy the following equation (3):

[precipitated Fe]+[precipitated Cr]+[precipitated Si]$\geq$0.02 percent by mass  (3)

wherein,

[precipitated Fe]: content (percent by mass) of Fe in the precipitate;

[precipitated Cr]: content (percent by mass) of Cr in the precipitate; and

[precipitated Si]: content (percent by mass) of Si in the precipitate.

The total content of Fe, Cr and Si in the precipitate is preferably 0.05 percent by mass or more.

The method for producing a metallic material for fuel cells further comprises pressing, cutting, corrugating, or etching the metallic material for fuel cells.

In the method for producing a metallic material for fuel cells, the metallic material for fuel cells is used for solid-oxide fuel cells.

In the method for producing a metallic material for fuel cells, the metallic material for fuel cells is used for interconnects of solid-oxide fuel cells.

DETAILED DESCRIPTION

The composition of a metallic material for interconnects of solid-oxide fuel cells will be described below.

(1) Mo: 0.03 to 5.0 Percent by Mass, Nb: 0.1 to 3.0 Percent by Mass, and $0.1 \leq Mo/Nb \leq 30$ The metallic material comprises a composition containing a Fe—Cr alloy as a base, and Mo and Nb both of which are added to the base, so that Mo and Nb combine with Cr, Fe, and Si to precipitate a large amount of an intermetallic compound in the grain boundaries of a base material in a long-term high-temperature operating environment at 700° C. to 900° C., which is an operating environment of solid-oxide fuel cells, thereby controlling a diffusion mechanism of each of the elements of Cr, Fe and Si and improving oxidation resistance. However, since the excessive addition of Mo and Nb deteriorates workability, the Mo and Nb contents are limited to 0.03 to 5.0 percent by mass and 0.1 to 3.0 percent by mass, respectively, and the ratio Mo/Nb is limited in the range of $0.1 \leq Mo/Nb \leq 30$. The reason for limiting the ratio Mo/Nb to this range is that when Mo/Nb<0.1 or Mo/Nb>30, the intermetallic compound is not sufficiently precipitated in the grain boundaries to fail to achieve the effect of improving the oxidation resistance. More preferably, Mo is 0.1 to 3.0 percent by mass, Nb is 0.1 to 2.0 percent by mass, and $0.5 \leq Mo/Nb \leq 30$.

(2) C: 0.20 Percent by Mass or Less

C forms a carbide and has the function to increase high-temperature strength. In order to achieve this function, 0.001 percent by mass or more of C is preferably added. However, with an adding amount of over 0.20 percent by mass, workability deteriorates, and C combines with Cr to decrease the amount of Cr effective for the oxidation resistance. Therefore, the C content is limited to 0.20 percent by mass or less, and preferably 0.10 percent by mass or less.

(3) Si: 0.02 to 1.0 Percent by Mass

Si has the function to accelerate precipitation of the intermetallic compound. However, the excessive addition of Si deteriorates workability and produces $SiO_2$ having low electrical conductivity near the interface between an oxide layer and the base material to decrease electrical conductivity. Therefore, the Si content is limited to 0.02 to 1.0 percent by mass, and preferably 0.05 to 1.0 percent by mass.

(4) Mn: 2.0 Percent by Mass or Less

Mn is necessary for improving the adhesion of the oxide layer. In order to obtain this effect, 0.05 percent by mass or more of Mn is preferably added. However, the excessive addition of Mn increases the oxidation rate. Therefore, the Mn content is limited to 2.0 percent by mass or less.

(5) Cr: 10 to 40 Percent by Mass

Cr is an important element for maintaining the oxidation resistance and electrical conductivity by the formation of a $Cr_2O_3$ layer. However, the excessive addition of Cr deteriorates workability. Therefore, the Cr content is limited to 10 to 40 percent by mass, and preferably 10 to 30 percent by mass.

(6) At Least One of Sc, Y, La, Ce, Pr, Nd, Pm, Sm, Zr, and Hf: a Total of 1.0 Percent by Mass or Less When at least one of Sc, Y, La, Ce, Pr, Nd, Pm, Sm, Zr, and Hf in a total of as small as 0.005 percent by mass or more is added for improving the adhesion of the oxide layer, the effect of improving the oxidation resistance is exhibited. However, the excessive addition of such an element deteriorates hot workability. Therefore, the content is limited to 1.0 percent by mass or less, and preferably 0.005 to 0.5 percent by mass.

(7) Others

Besides the above essential components, the metallic material may contain the elements below according to demand.

Al: 2.0 percent by mass or less, Cu: 0.20 percent by mass or less, Ni: 1.0 percent by mass or less, V: 1.0 percent by mass or less, W: 3.0 percent by mass or less, Ta: 2.0 percent by mass or less, Ti: 0.5 percent by mass or less, Mg: 0.05 percent by mass or less, Ca: 0.05 percent by mass or less, Co: 5.0 percent by mass or less Besides the above components, the metallic material contains Fe and inevitable impurities. However, when the contents of the impurities of P, S and N are 0.05 percent by mass or less, 0.05 percent by mass or less, and 0.5 percent by mass or less, respectively, each of the characteristics is particularly not affected.

(8) Amount of Precipitate:

The most important characteristic is that an intermetallic compound of Mo and Nb, which is a precipitate, is precipitated in the grain boundaries of the base material in a long-term high-temperature operating environment at 700° C. to 900° C., which is an operating environment of solid-oxide fuel cells. Namely, a large amount of the intermetallic compound is precipitated in the grain boundaries in the long-term high-temperature operating environment at 700° C. to 900° C., which is an operating environment of solid-oxide fuel cells, to control the diffusion mechanism of each of the elements such as Cr, Fe, and Si and improve the oxidation resistance. In the composition range, most of Fe, Cr and Si contained in the precipitate are contained in the intermetallic compound, and thus the amount of the intermetallic compound precipitated can be controlled by controlling the total content of the Fe, Cr and Si in the precipitate.

Therefore, in the use of the cell at an operating temperature of 800° C. for 1000 hours, the Fe, Cr and Si contents in the precipitate on the basis of the metallic material preferably satisfy the following equation (2):

$$[\text{precipitated Fe}]+[\text{precipitated Cr}]+[\text{precipitated Si}] \geq 0.03 \text{ percent by mass} \quad (2)$$

wherein,

[precipitated Fe]: content (percent by mass) of Fe in the precipitate;

[precipitated Cr]: content (percent by mass) of Cr in the precipitate; and

[precipitated Si]: content (percent by mass) of Si in the precipitate.

The total content of Fe, Cr and Si in the precipitate is preferably 0.10 percent by mass or more.

The precipitate in a hot-rolled material or cold-rolled material before use for a solid-oxide fuel cell preferably contains Fe, Cr and Si at contents on the basis of the metallic material satisfying the following equation (1):

$$[\text{precipitated Fe}]+[\text{precipitated Cr}]+[\text{precipitated Si}] \geq 0.01 \text{ percent by mass} \quad (1)$$

wherein,

[precipitated Fe]: content (percent by mass) of Fe in the precipitate;

[precipitated Cr]: content (percent by mass) of Cr in the precipitate; and

[precipitated Si]: content (percent by mass) of Si in the precipitate.

The total content of Fe, Cr and Si in the precipitates is preferably 0.03 percent by mass or more.

When the equation (1) is satisfied, a large amount of the precipitate, i.e., the intermetallic compound, can easily be precipitated in the grain boundaries of the base material in a long-term high-temperature operating environment at 700° C. to 900° C., which is an operating environment of solid-oxide fuel cells.

The hot-rolled material or cold-rolled material may be previously subjected to a precipitation treatment at 500° C. to 900° C. for 1 to 200 hours in an any desired atmosphere of argon, air, or the like so that the Fe, Cr and Si contents in the precipitate on the basis of the metallic material satisfy the following equation (3):

$$[\text{precipitated Fe}]+[\text{precipitated Cr}]+[\text{precipitated Si}] \geq 0.02 \text{ percent by mass} \quad (3)$$

wherein,

[precipitated Fe]: content (percent by mass) of Fe in the precipitate;

[precipitated Cr]: content (percent by mass) of Cr in the precipitate; and

[precipitated Si]: content (percent by mass) of Si in the precipitate.

The total content of Fe, Cr and Si in the precipitate is preferably 0.05 percent by mass or more.

The amount of each of the precipitated elements Fe, Cr and Si was determined by the method below. Each of test materials before and after an oxidation resistance test and after the precipitation treatment was melted by constant-current electrolysis in a non-aqueous solvent comprising a 10% AA electrolyte (10% acetylacetone-1% tetramethylammonium chloride-methanol balance), and then the amounts of Fe, Cr and Si in the extract residue were quantitatively analyzed by radio-frequency inductively coupled plasma emission spectrometry (Inductively Coupled Plasma-Atomic Emission). The amount (percent by mass on the basis of the metallic material) of each of the precipitated elements Fe, Cr and Si was determined from the obtained result.

(9) Thermal Expansion Coefficient: $13.0 \times 10^{-6}/°$ C. or Less from 20° C. to 900° C.

The target thermal expansion coefficient is $13.0 \times 10^{-6}/°$ C. or less from 20° C. to 900° C. With a thermal expansion coefficient of over $13.0 \times 10^{-6}/°$ C. from 20° C. to 900° C., separation from an electrolyte possibly occurs due to a difference of thermal expansion. Therefore, the thermal expansion coefficient is preferably $13.0 \times 10^{-6}/°$ C. or less from 20° C. to 900° C., and more preferably $12.6 \times 10^{-6}/°$ C. or less from 20° C. to 900° C. In measurement of the thermal expansion coefficient, a sample of 20 mm×5 mm was heated from 20° at a rate of 5° C./min in an argon atmosphere to measure the length L mm in the longitudinal direction when the temperature reached 900° C., and (L-20)/20 was divided by (900-20)° C. to determine the thermal expansion coefficient. For each sample, three test pieces were measured, and the measurements were averaged.

(10) Electrical Resistance: 50 mΩ·cm² or Less

Figure 2:
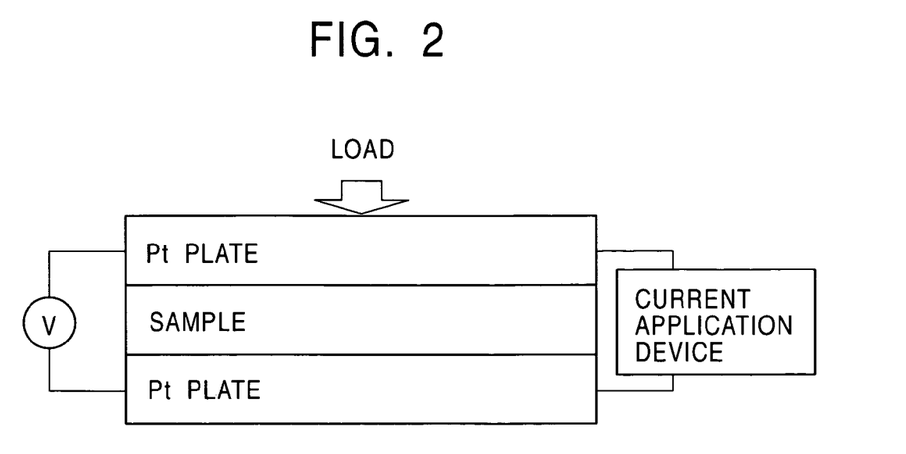
FIG. 2 is a drawing schematically showing an apparatus for measuring the electrical resistance of an interconnect.

The target electrical resistance of the present invention is 50 mΩ·cm² or less. With an electrical resistance of over 50 mΩ·cm², the cell performance significantly deteriorates. Therefore, the electrical resistance is preferably 50 mΩ·cm² or less, and more preferably 30 mΩ·cm² or less. The electrical resistance was measured by a method in which as shown in FIG. 2, a sample (a 20-mm square having a thickness of each of 1 mm and 5 mm) was sandwiched between 20-mm square Pt plates of 1 mm in thickness, a current applying Pt wire and a voltage measuring Pt wire were connected to each of the upper and lower Pt plates, and the sample was allowed to stand in a furnace at 800° C. for 1 hour with a load of 0.2 MPa applied thereto. Then, a current of 1.2 A was passed to measure a voltage between the upper and lower Pt plates, and the obtained resistance value was multiplied by an area of 4 cm² to determine the electrical resistance (area specific resistance). For each sample, three test pieces were measured, and the measurements were averaged.

(11) Structure of Base Material

The structure preferably has as a small amount of austenitic phase with a high thermal expansion coefficient as possible, and the area ratio of the austenitic phase is preferably 10 percent or less. A ferritic single phase (partially precipitated) or a two-phase structure (partially precipitated) of ferrite and austenite is more preferable because of the advantage that the thermal expansion coefficient is lower than that of austenite.

(12) Production Method

Next, the method for producing the metallic material will be described in brief.

As a method for melting the metallic material, any one of known conventional methods can be used, and thus the melting method is not particularly limited. For example, a steel-making process preferably comprises forming molten steel in a converter, an electrical furnace, or the like, the molten steel being prepared in the above-described proper composition range; and then secondarily refining the steel by strongly stirred-vacuum oxygen decarbonization (SS-VOD). As a casing method, continuous casting is preferred from the viewpoint of productivity and quality. A slab obtained by casting is re-heated as occasion demands and then hot-rolled, and then the hot-rolled sheet is annealed at 700° C. to 1200° C. and then pickled.

The hot-rolled sheet after pickling is suitable as a raw material for forming gas channels therein by cutting to produce an interconnect. On the other hand, when an interconnect is produced by pressing, the hot-rolled sheet is preferably further cold-rolled or cold-rolled, annealed at 700° C. to 1200° C., and then pickled to form a cold-rolled sheet as a raw material. Of course, the hot-rolled sheet may also be used as a raw material for pressing, or the cold-rolled sheet may be used as a raw material for cutting. In order to form grooves for forming the gas channels, a method other than cutting and pressing, for example, corrugating, etching, or the like may be used.

Before being incorporated into the interconnect, the hot-rolled sheet or the cold-rolled annealed sheet may be previously subjected to a precipitation treatment at 500° C. to 900° C. for 1 to 200 hours in any desired atmosphere of argon, air, or the like so that the Fe, Cr and Si contents in the precipitate on the basis of the metallic material satisfy the following equation (3):

[precipitated Fe]+[precipitated Cr]+[precipitated Si]≧0.02 percent by mass   (3)

wherein,

[precipitated Fe]: content (percent by mass) of Fe in the precipitate;

[precipitated Cr]: content (percent by mass) of Cr in the precipitate; and

[precipitated Si]: content (percent by mass) of Si in the precipitate.

The total content of Fe, Cr and Si in the precipitate is preferably 0.05 percent by mass or more.

The hot-rolled sheet or the cold-rolled annealed sheet may be formed into a component member (for example, a heat exchanger, a reforming device, or the like) of a fuel cell, other than the interconnect. A method for welding such a member is not particularly limited, and electrical-resistance welding such as arc welding using MIG (Metal Inert Gas), MAG (Metal Active Gas), TIG (Tungsten Inert Gas), or the like, spot welding, seam welding, or the like, high-frequency resistance welding such as electrical sewing welding, high-frequency induction welding, brazing, or the like may be used.

EXAMPLE 1

Each of various metallic materials having the respective compositions shown in Table 1 was prepared in a converter and by secondary refining, and then formed into a slab of 200 mm in thickness by continuous casting. The slab was heated to 1250° C. and then hot-rolled to form a hot-rolled sheet of 5 mm in thickness. The hot-rolled sheet was annealed at 700° C. to 1200° C. and pickled. Next, the sheet was cold-rolled to form a cold-rolled sheet of 1 mm in thickness, annealed at 700° C. to 1200° C. and then pickled. A sample of 1 mm×30 mm×30 mm was cut out from the cold-rolled sheet and used for the test below.

<Oxidation Resistance Test>

A test piece was subjected to an oxidation test in which the test piece was maintained under heating in an air atmosphere in a furnace heated to 800° C. for 1000 hours, and the oxide formed on the surface of the steel sheet was identified by X-ray diffraction. Also, the difference between the weights before and after the test was divided by the total area of the test piece to determine a weight increase by oxidation. With respect to the adhesion of the oxide layer, nylon brash was pressed on the surface of the test piece with the hand after the oxidation test, and the surface was rubbed with the nylon brush 5 times to measure a difference between the weights before and after the rubbing operation. When the weight difference was 0.1 mg or less, the adhesion was evaluated as (○) representing no spalling, and when the weight difference exceeds 0.1 mg, the adhesion was evaluated as (×) representing the occurrence of spalling.

<Accelerated Test of Oxidation Resistance>

In order to evaluate long-term oxidation resistance, an accelerated test of oxidation resistance was carried out. The accelerated oxidation test was carried out at 1000° C. for 600 hours (800° C. for 1,000,000 hours or more) in an air atmosphere to examine the weight increase by oxidation and the adhesion of the oxide layer by the same method as in the above-described oxidation resistance test.

<Measurement of Amount of Precipitated Elements>

The amount of each of the elements Fe, Cr, and Si precipitated was determined by a method in which each of test materials before and after the oxidation resistance test was melted by constant-current electrolysis in a non-aqueous solvent comprising a 10% AA electrolyte (10% acetylacetone-1% tetramethylammonium chloride-methanol balance), and then the amounts of Fe, Cr and Si in the extract residue were quantitatively analyzed by radio-frequency inductively coupled plasma emission spectrometry (Inductively Coupled Plasma-Atomic Emission). The amount (percent by mass on the basis of the metallic material) of each of the elements Fe, Cr and Si precipitated was determined from the obtained result.

<Measurement of Thermal Expansion Coefficient>

In measurement of the thermal expansion coefficient, a sample of 20 mm×5 mm was heated from 20° at a heating rate of 5° C./min in an argon atmosphere to measure the length L mm in the longitudinal direction when the temperature reached 900° C., and (L-20)/20 was divided by (900-20)° C. to determine the thermal expansion coefficient. For each sample, three test pieces were measured, and the measurements were averaged.

<Measurement of Electrical Resistance>

The electrical resistance was measured by a method in which as shown in FIG. 2, a sample (a 20-mm square having a thickness of each of 1 mm and 5 mm) was sandwiched between 20-mm square Pt plates of 1 mm in thickness, a current applying Pt wire and a voltage measuring Pt wire were connected to each of the upper and lower Pt plates, and the sample was allowed to stand in a furnace at 800° C. for 1 hour with a load of 0.2 MPa applied thereto. Then, a current of 1.2 A was passed to measure a voltage between the upper and lower Pt plates, and the obtained resistance value was multiplied by an area of 4 cm$^2$ to determine the electrical resistance (area specific resistance). For each sample, three test pieces were measured, and the measurements were averaged.

The test results are summarized in Tables 2 and 3.

First, the test results (800° C. for 1000 hours) of oxidation resistance will be described. As shown in Table 2, in each of the material Nos. 2 to 12 and 36 to 47, the contents of C, Si, Mn, and Cr, and at least one selected from the group consisting of Sc, Y, La, Ce, Pr, Nd, Pm, Sm, Zr, and Hf are within our ranges, and a combination of Mo and Nb is added to the Fe—Cr alloy. Table 3 indicates that in any one of these materials, the Fe, Cr and Si contents on the basis of the metallic material in the precipitate of the metallic material before the oxidation resistance test satisfy the following equation (2):

[precipitated Fe]+[precipitated Cr]+[precipitated Si]≧0.01 percent by mass (2)

wherein,

[precipitated Fe]: content (percent by mass) of Fe in the precipitate;

[precipitated Cr]: content (percent by mass) of Cr in the precipitate; and

[precipitated Si]: content (percent by mass) of Si in the precipitate.

The Fe, Cr and Si contents on the basis of the metallic material in the precipitate of the metallic material after the oxidation resistance test satisfy the following equation (1):

[precipitated Fe]+[precipitated Cr]+[precipitated Si]≧0.03 percent by mass (1)

wherein,

[precipitated Fe]: content (percent by mass) of Fe in the precipitate;

[precipitated Cr]: content (percent by mass) of Cr in the precipitate; and

[precipitated Si]: content (percent by mass) of Si in the precipitate.

As shown in Table 2, any one of the materials of Nos. 2 to 12 and 36 to 47 shows a small weight increase by oxidation, and the combined addition of Mo and Nb has the significant effect of improving oxidation resistance. Also, the produced oxide is mainly composed of $Cr_2O_3$, and it is thus expected that the performance of the interconnect using any one of the materials little deteriorates. Furthermore, with the materials of Nos. 2 to 12 and 36 to 47 shown in Table 2, the results of the accelerated test (1000° C. for 600 hours) at a high temperature indicate that the spalling resistance of the oxide layer can be significantly improved by adding at least one selected from the group consisting of Sc, Y, La, Ce, Pr, Nd, Pm, Sm, Zr, and Hf. As shown in Table 3, any one of the materials of Nos. 2 to 12 and 36 to 47 shows a thermal expansion coefficient of 13.0×10$^{-6}$/° C. or less from 20° C. to 900° C. It is thus thought that spalling from another member made of yttria stabilized zirconia or the like possibly little occurs due to a difference of thermal expansion. In each of the materials of Nos. 2 to 12 and 36 to 47, the electrical resistance is 50 mΩ·cm$^2$ or less, thereby exhibiting the significant effect of suppressing an increase in electrical resistance due to a decrease in the growth rate of the oxide layer.

On the other hand, when any one of C, Si, Mn, Cr, Mo, Nb and at least one selected from the group consisting of Sc, Y, La, Ce, Pr, Nd, Pm, Sm, Zr, and Hf is not added or added at a content out of our ranges, the material cannot be used as an interconnect, as shown in the examples below.

For example, the materials of Nos. 33 and 34 were tested by the same methods as those for conventional examples, No. 5 shown in Table 2 of Japanese Unexamined Patent Application Publication No. 9-157801 and No. 3 shown in Table 1 of Japanese Unexamined Patent Application Publication No. 10-280103, respectively. However, the electrical resistance is significantly high because of the high growth rate of the oxide layer. Each of the materials of Nos. 27 and 52 produced no protective layer because of a small amount of Cr to cause abnormal oxidation, and the electrical resistance could not be measured. In the materials of Nos. 28 and 53 each containing excess Cr, the workability deteriorates, and the oxidation resistance is also adversely affected. Furthermore, in the materials of Nos. 24 and 49 having a high C content, C combines with Cr to decrease an effective Cr amount, thereby decreasing the oxidation resistance. In the materials of Nos. 25 and 50 containing a large amount of Si, a large amount of $SiO_2$, which cannot be observed by X-ray diffraction, is produced to significantly increase the electrical resistance.

Although Mn suppresses spalling of an oxide, the oxide is produced in a surface layer because of the low diffusion rate in a $Cr_2O_3$ layer. Therefore, in the materials Nos. 26 and 51 having a high Mn content, the oxide layer becomes excessively thick to adversely affect the electrical resistance. As shown in the materials of Nos. 29 and 54, the excessive addition of Mo deteriorates the workability and the spalling resistance, and thus has the little effect of improving oxidation resistance. This applies to Nb (Nos. 30 and 55). When the condition 0.1≦Mo/Nb≦30 is not satisfied (Nos. 31, 32, 56, and 57), the amount of the precipitate is small, and the effect of improving oxidation resistance is also small.

With the materials of Nos. 1 and 13 to 32 not containing at least one of Sc, Y, La, Ce, Pr, Nd, Pm, Sm, Zr, and Hf or containing such an element at a content out of the range of the present invention, the weight increase by oxidation is a minus value in the results of the accelerated test at a high temperature shown in Table 2, except in the materials of Nos. 16, 23 and 26. This indicates that the oxide layer peels, and thus these materials cannot be used for interconnects. The materials of Nos. 16, 23 and 26 not exhibiting a minus value of the weight increase by oxidation show high electrical resistance.

EXAMPLE 2

The characteristics of a hot-rolled sheet were examined. A 5-mm hot-rolled sheet of the material of No. 2 shown in Table 1 of Example 1 was annealed at 1050° C. and descaled by immersion in a mixed acid (15 percent by mass of nitric acid+5 percent by mass of fluoric acid) at 60° C. to obtain a hot-rolled annealed sheet. The obtained hot-rolled annealed sheet was subjected to an oxidation resistance test, an oxidation resistance accelerated test, and measurement of a thermal expansion coefficient and electrical resistance by the same methods as in Example 1.

As a result of the oxidation resistance test, the oxidation resistance accelerated test, and the measurement of total amounts of [precipitated Fe]+[precipitated Cr]+[precipitated Si] before and after the oxidation resistance test, the thermal expansion coefficient and electrical resistance, the hot-rolled annealed sheet formed by using the material of No. 2 shown in Table 1 showed 1.6 g/m$^2$ in the oxidation resistance test, 60.2 g/m$^2$ in the oxidation resistance accelerated test, total amounts of [precipitated Fe]+[precipitated Cr]+[precipitated Si] of 0.03 percent by mass (before the oxidation resistance test) and 0.50 percent by mass (after the oxidation resistance test), a thermal expansion coefficient of 12.6×10$^{-6}$/° C., and an electrical resistance of 28 mΩ·cm$^2$. Therefore, it could be confirmed that the interconnect characteristics of the hot-rolled annealed sheet formed by using the material of No. 2 shown in Table 1 are substantially the same as those of the cold-rolled annealed sheets shown in Table 2 and 3.

EXAMPLE 3

The cold-rolled annealed sheet formed by using the material No. 5 shown in Table 1 of Example 1 and the hot-rolled sheet formed in Example 2 were subjected to a precipitation treatment at 800° C. for 10 hours, and then examined with respect to the characteristics. The cold-rolled annealed sheet and the hot-rolled annealed sheet after the precipitation treatment were subjected to an oxidation resistance test, an oxidation resistance accelerated test, and measurement of a thermal expansion coefficient measurement and electrical resistance by the same methods as in Example 1.

As a result of the oxidation resistance test, the oxidation resistance accelerated test, and the measurement of total amounts of [precipitated Fe]+[precipitated Cr]+[precipitated Si] before and after the oxidation resistance test, the thermal expansion coefficient and electrical resistance, the cold-rolled annealed sheet formed by using the material of No. 5 shown in Table 1 showed 1.7 g/m$^2$ in the oxidation resistance test, 64.3 g/m$^2$ in the oxidation resistance accelerated test, total amounts of [precipitated Fe]+[precipitated Cr]+[precipitated Si] of 0.05 percent by mass (before the oxidation resistance test) and 0.54 percent by mass (after the oxidation resistance test), a thermal expansion coefficient of 12.4×10$^{-6}$/° C., and an electrical resistance of 28 mΩ·cm$^2$. The hot-rolled sheet of Example 2 showed 1.5 g/m$^2$ in the oxidation resistance test, 58.4 g/m$^2$ in the oxidation resistance accelerated test, total amounts of [precipitated Fe]+[precipitated Cr]+[precipitated Si] of 0.05 percent by mass (before the oxidation resistance test) and 0.51 percent by mass (after the oxidation resistance test), a thermal expansion coefficient of 12.6×10$^{-6}$/° C., and an electrical resistance of 27 mΩ·cm$^2$. Therefore, it could be confirmed that the characteristics of the hot-rolled annealed sheet and the cold-rolled annealed sheet previously subjected to the precipitation treatment are substantially the same as those of a material not subjected to the precipitation treatment.

EXAMPLE 4

Figure 3:
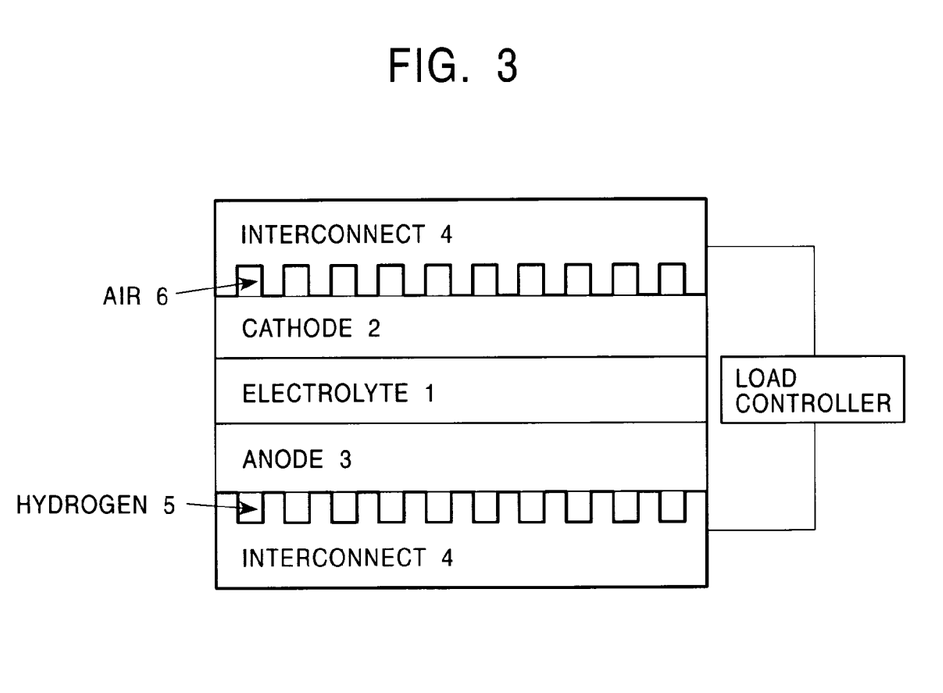
FIG. 3 is a drawing schematically showing an apparatus for measuring the power generation property of a solid-oxide fuel cell.

An interconnect was formed by using the cold-rolled annealed sheet formed by using the material of No. 2 shown in Table 1 of Example 1 and then examined with respect to generating characteristics (decrease in output voltage) of a fuel cell by using a test apparatus comprising the single cell shown in FIG. 3. In order to evaluate the generating characteristics, an anode (fuel-electrode) material was prepared by mixing NiO powder and YSZ powder at a weight ratio of 4:6, and a cathode (air-electrode) material was prepared by mixing a $La_{0.8}Sr_{0.2}MnO_3$ powder and YSZ powder at a weight ratio of 8:2. The anode material was screen-printed to a thickness of 50 μm on one of the surfaces of a 105-mm square electrolyte plate having a thickness of 0.2 mm and formed by annealing yttria stabilized zirconia (YSZ), and the cathode material was screen-printed to a thickness of 50 μm on the other surface of the electrolyte plate, and then the electrolyte plate was burned at 1400° C. to form an electrolyte-electrode assembly used for evaluating the generating characteristics. In the interconnect used for forming the single cell, 10 grooves of 5 mm wide were formed by cutting at intervals of 5 mm in a 105-mm square cold-rolled annealed sheet having a thickness of 1 mm to form gas channels of 0.5 mm in depth. The interconnects were disposed on both sides of the electrolyte-electrode assembly. Then, ultrapure hydrogen (purity 99.9999%) and air with a dewpoint of 30° C. were passed on the fuel-electrode side and the air-electrode side, respectively, to perform a power generation test at a current density 0.2 A/cm$^2$ and a temperature of 750° C. The performance of the cell was evaluated by measuring the voltage 1000 hours after. Three samples were measured, and the measurements were averaged.

As a result of the measurement, a decrease (constant current) in output voltage 1000 hours after was as low as 1.8%, and it was thus confirmed that the metallic material of the present invention has sufficient characteristics as interconnects of solid-oxide fuel cells.

INDUSTRIAL APPICABILITY

A metallic material for interconnects of solid-oxide fuel cells having excellent oxidation resistance can be obtained by adding a combination of Mo and Nb, and at lease one element selected from the group consisting of Sc, Y, La, Ce, Pr, Nd, Pm, Sm, Zr, and Hf to a Fe—Cr alloy. Also, the growth rate of an oxide layer at a high temperature can be decreased to effectively prevent spalling. By using the metallic material for an interconnect of a solid-oxide fuel cell, deterioration in the performance of the cell can be suppressed even in use at a high temperature for a long time, and the cost of the fuel cell can be decreased. Therefore, the material significantly contributes to practical use and size increase of fuel cells.

TABLE 1-1

| Steel No. | Chemical Composition (mass %) | | | | | | | | Mo/Nb | Remarks |
|---|---|---|---|---|---|---|---|---|---|---|
| | C | Si | Mn | Fe | Cr | Mo | Nb | Other | | |
| 1 | 0.004 | 0.11 | 0.11 | Bal. | 19.65 | 1.98 | 0.34 | — | 5.82 | Comp. |
| 2 | 0.004 | 0.11 | 0.10 | Bal. | 19.65 | 1.97 | 0.33 | La: 0.05 | 5.97 | Exam. |
| 3 | 0.004 | 0.11 | 0.10 | Bal. | 19.98 | 2.04 | 0.37 | Y: 0.07 | 5.51 | Exam. |

TABLE 1-1-continued

| Steel No. | \multicolumn{9}{c}{Chemical Composition (mass %)} | Remarks |
|---|---|---|---|---|---|---|---|---|---|---|
| | C | Si | Mn | Fe | Cr | Mo | Nb | Other | Mo/Nb | |
| 4 | 0.005 | 0.13 | 0.10 | Bal. | 20.11 | 2.01 | 0.38 | Zr: 0.15 | 5.29 | Exam. |
| 5 | 0.004 | 0.10 | 0.10 | Bal. | 20.03 | 1.91 | 0.33 | Hf: 0.08 | 5.79 | Exam. |
| 6 | 0.004 | 0.11 | 0.11 | Bal. | 20.01 | 2.01 | 0.34 | Sc: 0.03 | 5.91 | Exam. |
| 7 | 0.006 | 0.12 | 0.10 | Bal. | 19.95 | 2.11 | 0.31 | Ce: 0.06 | 6.81 | Exam. |
| 8 | 0.006 | 0.11 | 0.13 | Bal. | 19.77 | 1.94 | 0.35 | Pr: 0.05 | 5.54 | Exam. |
| 9 | 0.004 | 0.11 | 0.13 | Bal. | 19.86 | 2.04 | 0.35 | Nd: 0.05 | 5.83 | Exam. |
| 10 | 0.005 | 0.10 | 0.12 | Bal. | 20.12 | 2.03 | 0.34 | Pm: 0.06 | 5.97 | Exam. |
| 11 | 0.004 | 0.10 | 0.12 | Bal. | 20.45 | 1.90 | 0.33 | Sm: 0.05 | 5.76 | Exam. |
| 12 | 0.003 | 0.13 | 0.11 | Bal. | 20.08 | 2.13 | 0.34 | La: 0.71 | 6.26 | Exam. |
| 13 | 0.150 | 0.10 | 0.12 | Bal. | 20.09 | 2.13 | 0.31 | — | 6.87 | Comp. |
| 14 | 0.004 | 0.05 | 0.11 | Bal. | 19.35 | 2.18 | 0.33 | — | 6.61 | Comp. |
| 15 | 0.005 | 0.72 | 0.13 | Bal. | 19.56 | 1.89 | 0.35 | — | 5.40 | Comp. |
| 16 | 0.005 | 0.13 | 1.83 | Bal. | 19.99 | 2.01 | 0.34 | — | 5.91 | Comp. |
| 17 | 0.005 | 0.11 | 0.11 | Bal. | 14.75 | 2.08 | 0.35 | — | 5.94 | Comp. |
| 18 | 0.005 | 0.12 | 0.11 | Bal. | 30.29 | 1.94 | 0.34 | — | 5.71 | Comp. |
| 19 | 0.004 | 0.11 | 0.12 | Bal. | 19.87 | 0.10 | 0.36 | — | 0.28 | Comp. |
| 20 | 0.005 | 0.10 | 0.13 | Bal. | 19.73 | 4.16 | 0.34 | — | 12.24 | Comp. |
| 21 | 0.004 | 0.12 | 0.11 | Bal. | 20.04 | 2.09 | 0.20 | — | 10.45 | Comp. |
| 22 | 0.004 | 0.11 | 0.12 | Bal. | 19.54 | 2.01 | 2.40 | — | 0.84 | Comp. |
| 23 | 0.004 | 0.09 | 0.11 | Bal. | 20.05 | — | — | — | — | Comp. |
| 24 | 0.300 | 0.09 | 0.12 | Bal. | 20.35 | 2.04 | 0.33 | — | 6.18 | Comp. |
| 25 | 0.006 | 3.50 | 0.09 | Bal. | 19.88 | 1.94 | 0.32 | — | 6.06 | Comp. |
| 26 | 0.004 | 0.10 | 2.20 | Bal. | 20.03 | 2.15 | 0.38 | — | 5.66 | Comp. |
| 27 | 0.006 | 0.12 | 0.09 | Bal. | 6.24 | 1.99 | 0.35 | — | 5.69 | Comp. |
| 28 | 0.005 | 0.10 | 0.12 | Bal. | 45.22 | 2.02 | 0.36 | — | 5.61 | Comp. |
| 29 | 0.005 | 0.11 | 0.10 | Bal. | 20.12 | 6.11 | 0.34 | — | 17.97 | Comp. |
| 30 | 0.004 | 0.12 | 0.12 | Bal. | 19.45 | 1.91 | 4.05 | — | 0.47 | Comp. |
| 31 | 0.005 | 0.11 | 0.13 | Bal. | 20.18 | 0.03 | 0.39 | — | 0.08 | Comp. |
| 32 | 0.006 | 0.09 | 0.11 | Bal. | 19.75 | 3.64 | 0.12 | — | 30.33 | Comp. |
| 33 | 0.024 | 0.42 | 0.51 | Bal. | 21.94 | — | — | La: 0.03<br>Zr: 0.24 | — | Conventional steel No. 5 of JP9-157801 |
| 34 | 0.030 | 0.45 | 0.63 | Bal. | 24.10 | — | — | Hf: 0.15 | — | Conventional steel No. 3 of JP10-280103 |

Exam.: Example
Comp.: Comparative Example

TABLE 1-2

| Steel No. | \multicolumn{9}{c}{Chemical Composition (mass %)} | Remarks |
|---|---|---|---|---|---|---|---|---|---|---|
| | C | Si | Mn | Fe | Cr | Mo | Nb | Other | Mo/Nb | |
| 35 | 0.024 | 0.15 | 0.16 | Bal. | 21.80 | — | — | La:0.03<br>Zr:0.27 | — | Comp. |
| 36 | 0.145 | 0.11 | 0.09 | Bal. | 19.87 | 2.01 | 0.35 | La:0.06 | 5.74 | Exam. |
| 37 | 0.005 | 0.05 | 0.12 | Bal. | 20.11 | 1.97 | 0.34 | La:0.04 | 5.79 | Exam. |
| 38 | 0.004 | 0.81 | 0.09 | Bal. | 20.06 | 1.99 | 0.33 | La:0.05 | 6.03 | Exam. |
| 39 | 0.005 | 0.12 | 1.45 | Bal. | 19.87 | 1.98 | 0.33 | La:0.05 | 6.00 | Exam. |
| 40 | 0.004 | 0.09 | 0.12 | Bal. | 14.87 | 2.11 | 0.34 | La:0.06 | 6.21 | Exam. |
| 41 | 0.004 | 0.11 | 0.13 | Bal. | 30.32 | 2.01 | 0.32 | La:0.05 | 6.28 | Exam. |
| 42 | 0.005 | 0.12 | 0.13 | Bal. | 19.74 | 0.11 | 0.37 | La:0.07 | 0.30 | Exam. |
| 43 | 0.004 | 0.11 | 0.09 | Bal. | 20.01 | 4.21 | 0.32 | La:0.05 | 13.16 | Exam. |
| 44 | 0.005 | 0.11 | 0.10 | Bal. | 19.98 | 2.01 | 0.21 | La:0.06 | 9.57 | Exam. |
| 45 | 0.005 | 0.13 | 0.09 | Bal. | 19.99 | 1.94 | 2.40 | La:0.03 | 0.81 | Exam. |
| 46 | 0.004 | 0.13 | 0.11 | Bal. | 19.58 | 4.35 | 0.15 | La:0.04 | 29.00 | Exam. |
| 47 | 0.005 | 0.11 | 0.11 | Bal. | 20.08 | 0.30 | 0.50 | La:0.05 | 0.6 | Exam. |
| 48 | 0.005 | 0.11 | 0.09 | Bal. | 20.12 | — | — | La:0.03 | — | Comp. |
| 49 | 0.304 | 0.10 | 0.12 | Bal. | 19.95 | 1.94 | 0.38 | La:0.05 | 5.11 | Comp. |
| 50 | 0.003 | 3.76 | 0.11 | Bal. | 20.18 | 1.98 | 0.35 | La:0.07 | 5.66 | Comp. |
| 51 | 0.004 | 0.11 | 2.10 | Bal. | 20.13 | 2.03 | 0.32 | La:0.04 | 6.34 | Comp. |
| 52 | 0.005 | 0.11 | 0.10 | Bal. | 6.19 | 2.12 | 0.35 | La:0.03 | 6.06 | Comp. |
| 53 | 0.006 | 0.10 | 0.11 | Bal. | 45.58 | 2.08 | 0.33 | La:0.05 | 6.30 | Comp. |
| 54 | 0.005 | 0.09 | 0.11 | Bal. | 20.20 | 6.32 | 0.32 | La:0.08 | 19.75 | Comp. |
| 55 | 0.005 | 0.11 | 0.09 | Bal. | 19.87 | 2.11 | 4.05 | La:0.03 | 0.52 | Comp. |

TABLE 1-2-continued

| Steel No. | C | Si | Mn | Fe | Cr | Mo | Nb | Other | Mo/Nb | Remarks |
|---|---|---|---|---|---|---|---|---|---|---|
| 56 | 0.004 | 0.09 | 0.12 | Bal. | 19.91 | 0.03 | 0.41 | La:0.05 | 0.07 | Comp. |
| 57 | 0.006 | 0.09 | 0.10 | Bal. | 19.81 | 3.71 | 0.11 | La:0.04 | 33.73 | Comp. |

Exam.: Example
Comp.: Comparative Example
(Note):
"—" represents no addition.

TABLE 2-1

| Steel No. | Oxide | Test conditions: 800° C. × 1000 hr | | Test conditions: 1000° C. × 600 hr | | Remarks |
|---|---|---|---|---|---|---|
| | | Weight increase by oxidation (g/m$^2$) | Spalling resistance | Weight increase by oxidation (g/m$^2$) | Spalling resistance | |
| 1 | (Mn,Cr)$_3$O$_4$, Cr$_2$O$_3$ | 1.5 | ○ | −37.6 | x | Comp. |
| 2 | (Mn,Cr)$_3$O$_4$, Cr$_2$O$_3$ | 1.5 | ○ | 61.6 | ○ | Exam. |
| 3 | (Mn,Cr)$_3$O$_4$, Cr$_2$O$_3$ | 1.6 | ○ | 65.8 | ○ | Exam. |
| 4 | (Mn,Cr)$_3$O$_4$, Cr$_2$O$_3$ | 1.9 | ○ | 78.5 | ○ | Exam. |
| 5 | (Mn,Cr)$_3$O$_4$, Cr$_2$O$_3$ | 1.8 | ○ | 72.1 | ○ | Exam. |
| 6 | (Mn,Cr)$_3$O$_4$, Cr$_2$O$_3$ | 1.7 | ○ | 67.1 | ○ | Exam. |
| 7 | (Mn,Cr)$_3$O$_4$, Cr$_2$O$_3$ | 1.8 | ○ | 69.2 | ○ | Exam. |
| 8 | (Mn,Cr)$_3$O$_4$, Cr$_2$O$_3$ | 1.5 | ○ | 60.1 | ○ | Exam. |
| 9 | (Mn,Cr)$_3$O$_4$, Cr$_2$O$_3$ | 1.6 | ○ | 60.5 | ○ | Exam. |
| 10 | (Mn,Cr)$_3$O$_4$, Cr$_2$O$_3$ | 1.5 | ○ | 59.7 | ○ | Exam. |
| 11 | (Mn,Cr)$_3$O$_4$, Cr$_2$O$_3$ | 1.5 | ○ | 62.4 | ○ | Exam. |
| 12 | (Mn,Cr)$_3$O$_4$, Cr$_2$O$_3$ | 2.0 | ○ | 81.8 | ○ | Exam. |
| 13 | (Mn,Cr)$_3$O$_4$, Cr$_2$O$_3$ | 2.4 | ○ | −25.4 | x | Comp. |
| 14 | (Mn,Cr)$_3$O$_4$, Cr$_2$O$_3$ | 1.6 | ○ | −27.5 | x | Comp. |
| 15 | (Mn,Cr)$_3$O$_4$, Cr$_2$O$_3$ | 2.1 | ○ | −48.1 | x | Comp. |
| 16 | Mn$_2$O$_3$, (Mn,Cr)$_3$O$_4$, Cr$_2$O$_3$ | 12.8 | ○ | 95.4 | ○ | Comp. |
| 17 | (Mn,Cr)$_3$O$_4$, Cr$_2$O$_3$ | 1.4 | ○ | −11.5 | x | Comp. |
| 18 | (Mn.Cr)$_3$O$_4$, Cr$_2$O$_3$ | 1.7 | ○ | −40.0 | x | Comp. |
| 19 | (Mn,Cr)$_3$O$_4$, Cr$_2$O$_3$ | 2.2 | ○ | −35.9 | x | Comp. |
| 20 | (Mn,Cr)$_3$O$_4$, Cr$_2$O$_3$ | 2.3 | ○ | −14.6 | x | Comp. |
| 21 | (Mn,Cr)$_3$O$_4$, Cr$_2$O$_3$ | 1.9 | ○ | −32.3 | x | Comp. |
| 22 | (Mn.Cr)$_3$O$_4$, Cr$_2$O$_3$ | 1.6 | ○ | −53.9 | x | Comp. |
| 23 | (Mn,Cr)$_3$O$_4$, Cr$_2$O$_3$ | 3.2 | ○ | 13.5 | x | Comp. |
| 24 | (Mn,Cr)$_3$O$_4$, Cr$_2$O$_3$ | 3.1 | x | −12.7 | x | Comp. |
| 25 | (Mn,Cr)$_3$O$_4$, Cr$_2$O$_3$ | 3.3 | ○ | −51.2 | x | Comp. |
| 26 | Mn$_2$O$_3$, (Mn,Cr)$_3$O$_4$, Cr$_2$O$_3$ | 16.4 | ○ | 132.1 | ○ | Comp. |
| 27 | (Mn,Cr)$_3$O$_4$, Cr$_2$O$_3$, Fe$_3$O$_4$ | 100≦ | x | — | — | Comp. |
| 28 | (Mn,Cr)$_3$O$_4$, Cr$_2$O$_3$ | 3.5 | ○ | −24.5 | x | Comp. |
| 29 | (Mn,Cr)$_3$O$_4$, Cr$_2$O$_3$ | 3.4 | x | −5.4 | x | Comp. |
| 30 | (Mn,Cr)$_3$O$_4$, Cr$_2$O$_3$ | 3.1 | x | −70.5 | x | Comp. |
| 31 | (Mn,Cr)$_3$O$_4$, Cr$_2$O$_3$ | 3.3 | ○ | −36.3 | x | Comp. |
| 32 | (Mn,Cr)$_3$O$_4$, Cr$_2$O$_3$ | 3.5 | ○ | −10.7 | x | Comp. |
| 33 | (Mn,Cr)$_3$O$_4$, Cr$_2$O$_3$ | 12.8 | ○ | 90.2 | ○ | Conventional steel No. 5 of JP9-157801 |

TABLE 2-2

| Steel No. | Oxide | Test conditions: 800° C. × 1000 hr | | Test conditions: 1000° C. × 600 hr | | Remarks |
|---|---|---|---|---|---|---|
| | | Weight increase by oxidation (g/m$^2$) | Spalling resistance | Weight increase by oxidation (g/m$^2$) | Spalling resistance | |
| 34 | (Mn,Cr)$_3$O$_4$, Cr$_2$O$_3$ | 11.5 | ○ | 90.5 | ○ | Conventional steel No. 3 of JP10-280101 |

TABLE 2-2-continued

| | | Test conditions: 800° C. × 1000 hr | | Test conditions: 1000° C. × 600 hr | | |
|---|---|---|---|---|---|---|
| Steel No. | Oxide | Weight increase by oxidation (g/m$^2$) | Spalling resistance | Weight increase by oxidation (g/m$^2$) | Spalling resistance | Remarks |
| 35 | (Mn,Cr)$_3$O$_4$, Cr$_2$O$_3$ | 10.5 | ○ | 88.4 | ○ | Comp. |
| 36 | (Mn,Cr)$_3$O$_4$, Cr$_2$O$_3$ | 2.4 | ○ | 74.5 | ○ | Exam. |
| 37 | (Mn,Cr)$_3$O$_4$, Cr$_2$O$_3$ | 1.6 | ○ | 69.4 | ○ | Exam. |
| 38 | (Mn,Cr)$_3$O$_4$, Cr$_2$O$_3$ | 2.1 | ○ | 70.1 | ○ | Exam. |
| 39 | (Mn,Cr)$_3$O$_4$, Cr$_2$O$_3$ | 9.8 | ○ | 75.4 | ○ | Exam. |
| 40 | (Mn,Cr)$_3$O$_4$, Cr$_2$O$_3$ | 1.4 | ○ | 68.7 | ○ | Exam. |
| 41 | (Mn,Cr)$_3$O$_4$, Cr$_2$O$_3$ | 1.7 | ○ | 69.1 | ○ | Exam. |
| 42 | (Mn,Cr)$_3$O$_4$, Cr$_2$O$_3$ | 2.2 | ○ | 75.9 | ○ | Exam. |
| 43 | (Mn,Cr)$_3$O$_4$, Cr$_2$O$_3$ | 2.3 | ○ | 76.4 | ○ | Exam. |
| 44 | (Mn,Cr)$_3$O$_4$, Cr$_2$O$_3$ | 1.9 | ○ | 68.9 | ○ | Exam. |
| 45 | (Mn,Cr)$_3$O$_4$, Cr$_2$O$_3$ | 1.6 | ○ | 68.2 | ○ | Exam. |
| 46 | (Mn,Cr)$_3$O$_4$, Cr$_2$O$_3$ | 2.1 | ○ | 74.2 | ○ | Exam. |
| 47 | (Mn,Cr)$_3$O$_4$, Cr$_2$O$_3$ | 2.2 | ○ | 73.1 | ○ | Exam. |
| 48 | (Mn,Cr)$_3$O$_4$, Cr$_2$O$_3$ | 3.1 | ○ | 106.7 | ○ | Comp. |
| 49 | (Mn,Cr)$_3$O$_4$, Cr$_2$O$_3$ | 3.2 | ○ | 110.3 | ○ | Comp. |
| 50 | (Mn,Cr)$_3$O$_4$, Cr$_2$O$_3$ | 3.3 | ○ | 101.8 | ○ | Comp. |
| 51 | Mn2O$_3$, (Mn,Cr)$_3$O$_4$, Cr$_2$O$_3$ | 16.6 | ○ | 138.9 | ○ | Comp. |
| 52 | (Mn,Cr)$_3$O$_4$, Cr$_2$O$_3$, Fe$_3$O$_4$, | 100≦ | ○ | — | ○ | Comp. |
| 53 | (Mn,Cr)$_3$O$_4$, Cr$_2$O$_3$ | 3.4 | ○ | 103.2 | ○ | Comp. |
| 54 | (Mn,Cr)$_3$O$_4$, Cr$_2$O$_3$ | 3.6 | ○ | 104.5 | ○ | Comp. |
| 55 | (Mn,Cr)$_3$O$_4$, Cr$_2$O$_3$ | 3.2 | ○ | 111.7 | ○ | Comp. |
| 56 | (Mn,Cr)$_3$O$_4$, Cr$_2$O$_3$ | 3.3 | ○ | 118.9 | ○ | Comp. |
| 57 | (Mn,Cr)$_3$O$_4$, Cr$_2$O$_3$ | 3.4 | ○ | 107.4 | ○ | Comp. |

Exam.: Example
Comp.: Comparative Example
* A minus value of weight increase by oxidation represents the occurrence of spalling of a layer.

TABLE 3-1

| Steel No. | [precipitated Fe] + [precipitated Cr] + [precipitated Si] (mass %) | | Thermal expansion coefficient (10$^{-6}$/° C.) | Electrical resistance (mΩ·cm$^2$) | Remarks |
|---|---|---|---|---|---|
| | Before oxidation resistance test | After oxidation resistance test | | | |
| 1 | 0.03 | 0.51 | 12.6 | 26 | Comp. |
| 2 | 0.03 | 0.49 | 12.6 | 26 | Exam. |
| 3 | 0.03 | 0.52 | 12.5 | 27 | Exam. |
| 4 | 0.03 | 0.51 | 12.5 | 29 | Exam. |
| 5 | 0.03 | 0.48 | 12.4 | 29 | Exam. |
| 6 | 0.03 | 0.53 | 12.5 | 29 | Exam. |
| 7 | 0.04 | 0.55 | 12.6 | 28 | Exam. |
| 8 | 0.03 | 0.51 | 12.5 | 26 | Exam. |
| 9 | 0.03 | 0.48 | 12.6 | 27 | Exam. |
| 10 | 0.03 | 0.48 | 12.4 | 25 | Exam. |
| 11 | 0.03 | 0.48 | 12.5 | 25 | Exam. |
| 12 | 0.03 | 0.46 | 12.6 | 30 | Exam. |
| 13 | 0.04 | 0.51 | 12.5 | 45 | Comp. |
| 14 | 0.04 | 0.55 | 12.6 | 30 | Comp. |
| 15 | 0.03 | 0.49 | 12.4 | 31 | Comp. |
| 16 | 0.03 | 0.48 | 12.5 | 114 | Comp. |
| 17 | 0.04 | 0.53 | 12.5 | 25 | Comp. |
| 18 | 0.03 | 0.50 | 12.4 | 26 | Comp. |
| 19 | 0.01 | 0.04 | 12.6 | 42 | Comp. |
| 20 | 0.05 | 0.59 | 12.6 | 41 | Comp. |
| 21 | 0.02 | 0.03 | 12.5 | 29 | Comp. |
| 22 | 0.06 | 0.69 | 12.5 | 26 | Comp. |
| 23 | 0.005 | 0.01 | 12.5 | 52 | Comp. |
| 24 | 0.03 | 0.48 | 12.6 | 51 | Comp. |
| 25 | 0.05 | 0.54 | 12.4 | 152 | Comp. |
| 26 | 0.04 | 0.51 | 12.5 | 128 | Comp. |
| 27 | 0.03 | 0.50 | 12.5 | — | Comp. |
| 28 | 0.07 | 0.71 | 12.4 | 55 | Comp. |
| 29 | 0.06 | 0.63 | 12.6 | 56 | Comp. |
| 30 | 0.07 | 0.72 | 12.6 | 53 | Comp. |
| 31 | 0.007 | 0.21 | 12.5 | 51 | Comp. |
| 32 | 0.009 | 0.19 | 12.5 | 59 | Comp. |
| 33 | 0.005 | 0.03 | 13.5 | 320 | Conventional steel No. 5 of JP9-15780 |
| 34 | 0.006 | 0.03 | 13.4 | 304 | Conventional steel No. 3 of JP10-280103 |
| 35 | 0.004 | 0.02 | 13.2 | 298 | Comp. |
| 36 | 0.04 | 0.47 | 12.5 | 42 | Exam. |

Exam.: Example
Comp.: Comparative Example

TABLE 3-2

| Steel No. | [precipitated Fe] + [precipitated Cr] + [precipitated Si] (mass %) Before oxidation resistance test | [precipitated Fe] + [precipitated Cr] + [precipitated Si] (mass %) After oxidation resistance test | Thermal expansion coefficient ($10^{-6}$/° C.) | Electrical resistance (mΩ · cm$^2$) | Remarks |
|---|---|---|---|---|---|
| 37 | 0.04 | 0.51 | 12.6 | 31 | Exam. |
| 38 | 0.03 | 0.48 | 12.4 | 32 | Exam. |
| 39 | 0.03 | 0.45 | 12.5 | 49 | Exam. |
| 40 | 0.04 | 0.55 | 12.5 | 24 | Exam. |
| 41 | 0.03 | 0.42 | 12.4 | 28 | Exam. |
| 42 | 0.01 | 0.04 | 12.6 | 30 | Exam. |
| 43 | 0.05 | 0.59 | 12.6 | 32 | Exam. |
| 44 | 0.02 | 0.03 | 12.5 | 29 | Exam. |
| 45 | 0.06 | 0.54 | 12.5 | 26 | Exam. |
| 46 | 0.01 | 0.03 | 12.6 | 31 | Exam. |
| 47 | 0.01 | 0.04 | 12.4 | 33 | Exam. |
| 48 | 0.006 | 0.01 | 12.6 | 54 | Comp. |
| 49 | 0.03 | 0.45 | 12.5 | 53 | Comp. |
| 50 | 0.05 | 0.56 | 12.4 | 179 | Comp. |
| 51 | 0.04 | 0.49 | 12.5 | 125 | Comp. |
| 52 | 0.03 | 0.51 | 12.5 | — | Comp. |
| 53 | 0.06 | 0.70 | 12.4 | 56 | Comp. |
| 54 | 0.07 | 0.65 | 12.6 | 54 | Comp. |
| 55 | 0.06 | 0.71 | 12.5 | 51 | Comp. |
| 56 | 0.005 | 0.20 | 12.6 | 53 | Comp. |
| 57 | 0.01 | 0.19 | 12.5 | 59 | Comp. |

Exam.: Example
Comp.: Comparative Example

The invention claimed is:

1. A solid-oxide fuel cell using a metallic material the fuel cells comprising:
   0.006 percent by mass or less of C;
   0.02 to 0.13 percent by mass of Si;
   2.0 percent by mass or less of Mn;
   19.65 to 20.45 percent by mass of Cr;
   0.11 to 5.0 percent by mss of Mo;
   0.21 to 3.0 percent by mass of Nb;
   at least one element selected from the group consisting of Sc, Y, La, Ce, Pr, Nd, Pm, Sm, Zr, and Hf in a total of 0.03 to 1.0 percent by mass; and
   the balance composed of Fe and inevitable impurities;
   wherein $0.3 \leq$ Mo/Nb $\leq 9.57$ is satisfied, and further comprising a precipitate containing Fe, Cr and Si at contents on the basis of the metallic material satisfying the following equation (1):

$$[\text{precipitated Fe}]+[\text{precipitated Cr}]+[\text{precipitated Si}] \geq 0.01 \text{ percent by mass} \quad (1)$$

wherein,
   [precipitated Fe]: content (percent by mass) of Fe in the precipitate;
   [precipitated Cr]: content (percent by mass) of Cr in the precipitate; and
   [precipitated Si]: content (percent by mass) of Si in the precipitate, and the metallic material;
   wherein,
   when in use at a cell operating temperature of 800° C. for at least 1,000 hours or more, the Fe, Cr and Si contents in the precipitate on the basis of the metallic material satisfy the following equation (2):

$$[\text{precipitated Fe}]+[\text{precipitated Cr}]+[\text{precipitated Si}] \geq 0.03 \text{ percent by mass} \quad (2)$$

wherein,
   [precipitated Fe]: content (percent by mass) of Fe in the precipitate;
   [precipitated Cr]: content (percent by mass) of Cr in the precipitate; and
   [precipitated Si]: content (percent by mass) of Si in the precipitate.

2. The fuel cell according to claim 1, wherein the metallic material for fuel cells is a hot-rolled material.

3. The fuel cell according to claim 1, wherein the metallic material for fuel cells is a cold-rolled material.

4. The fuel cell according to claim 2, wherein the metallic material is further subjected to a precipitation treatment so that the Fe, Cr and Si contents in the precipitate on the basis of the metallic material satisfy the following equation (3):

$$[\text{precipitated Fe}]+[\text{precipitated Cr}]+[\text{precipitated Si}] \geq 0.02 \text{ percent by mass} \quad (3)$$

wherein,
   [precipitated Fe]: content (percent by mass) of Fe in the precipitate;
   [precipitated Cr]: content (percent by mass) of Cr in the precipitate; and
   [precipitated Si]: content (percent by mass) of Si in the precipitate.

5. The fuel cell according to claim 3, wherein the metallic material is further subjected to a precipitation treatment so that the Fe, Cr and Si contents in the precipitate on the basis of the metallic material satisfy the flowing equation (3):

$$[\text{precipitated Fe}]+[\text{precipitated Cr}]+[\text{precipitated Si}] \geq 0.02 \text{ percent by mass} \quad (3)$$

wherein,
   [precipitated Fe]: content (percent by mass) of Fe in the precipitate;
   [precipitated Cr]: content (percent by mass) of Cr in the precipitate; and
   [precipitated Si]: content (percent by mass) of Si in the precipitate.

6. A method for producing a fuel cell comprising:
   re-heating a steel material, if required;
   hot-rolling the steel material; and, if required,
   annealing and pickling the hot-rolled sheet;
   cold roiling the steel material;
   annealing the steel material;
   wherein the steel material is adjusted to contain:
   0.006 percent by mass or less of C;
   0.02 to 0.13 percent by mass of Si;
   2.0 percent by mass or less of Mn;
   19.65 to 20.45 percent by mass of Cr;
   0.11 to 5.0 percent by mass Mo;
   0.21 to 3.0 percent by mass of Nb;
   at least one of element selection from Sc, Y, La, Ce, Pr, Nd, Pm, Sm, Zr, and Hf in a total of 0.03 to 1.0 percent by mass; and
   the balance composed of Fe and inevitable impurities; and
   $0.3 \leq$ Mo/Nb $\leq 9.57$ is satisfied, and further comprises a precipitate containing Fe, Cr and Si at contents on the basis of the metallic material satisfying the following equation (1):

$$[\text{precipitated Fe}]+[\text{precipitated Cr}]+[\text{precipitated Si}] \geq 0.01 \text{ percent by mass} \quad (1)$$

wherein,
   [precipitated Fe]: content (percent by mass) of Fe in the precipitate;
   [precipitated Cr]: content (percent by mass) of Cr in the precipitate;

[precipitated Si]: content (percent by mass) of Si in the precipitate; and pressing the resulting metallic material to form a fuel cell.

7. The method according to claim 6, further comprising pickling after annealing the cold rolled steel material.

8. The method according to claim 6, further comprising performing a precipitation treatment of the metallic material for fuel cells so that the Fe, Cr and Si contents in the precipitate on the basis of the metallic material satisfy the following equation (3):

$$[\text{precipitated Fe}]+[\text{precipitated Cr}]+[\text{precipitated Si}] \geq 0.02 \text{ percent by mass} \quad (3)$$

wherein,

[precipitated Fe]: content (percent by mass) of Fe in the precipitate;

[precipitated Cr]: content (percent by mass) of Cr in the precipitate; and

[precipitated Si]: content (percent by mass) of Si in the precipitate.

9. A solid-oxide fuel cell using a metallic material for producing a fuel cell comprising:

0.006 percent by mass or less of C;

0.02 to 0.13 percent by mass of Si;

2.0 percent by mass or less of Mn;

19.65 to 20.45 percent by mass of Cr;

0.11 to 5.0 percent by mass of Mo;

0.21 to 3.0 percent by mass of Nb;

at least one element selected from the group consisting of Sc, La, Ce, Pr, Nd, Pm, Sm, Zr, and Hf in a total of 0.03 to 1.0 percent by mass; and the balance composed of Fe and inevitable impurities;

wherein $0.3 \leq \text{Mo/Nb} \leq 9.57$ is satisfied, and further comprising a precipitate containing Fe, Cr and Si at contents on the basis of the metallic material satisfying the following equation (1):

$$[\text{precipitated Fe}]+[\text{precipitated Cr}]+[\text{precipitated Si}] \geq 0.01 \text{ percent by mass} \quad (1)$$

wherein,

[precipitated Fe]: content (percent by mass) of Fe in the precipitate;

[precipitated Cr]: content (percent by mass) of Cr in the precipitate; and

[precipitated Si]: content (percent by mass) of Si in the precipitate, and the metallic material;

wherein, when in use at a cell operating temperature of 800° C. for at least 1,000 hours or more, the Fe, Cr and Si contents in the precipitate on the basis of the metallic material satisfy the following equation (2):

$$[\text{precipitated Fe}]+[\text{precipitated Cr}]+[\text{precipitated Si}] \geq 0.03 \text{ percent by mass} \quad (2)$$

wherein,

[precipitated Fe]: content (percent by mass) of Fe in the precipitate;

[precipitated Cr]: content (percent by mass) of Cr in the precipitate;

[precipitated Si]: content (percent by mass) of Si in the precipitate; and wherein the metallic material is corrugated to form fuel cell.

10. The fuel cell according to claim 1, having an electrical resistance of about 30 mΩ cm² or less at 800° C.

11. The fuel cell according to claim 1, wherein the precipitate contains Mo and Nb combined with Fe, Cr and Si in grain boundaries of the metallic material.

12. The method according to claim 6, wherein the precipitate contains Mo and Nb combined with Fe, Cr and Si in grain boundaries of the metallic material.

* * * * *

UNITED STATES PATENT AND TRADEMARK OFFICE
CERTIFICATE OF CORRECTION

PATENT NO. : 7,531,053 B2 Page 1 of 1
APPLICATION NO. : 10/509469
DATED : May 12, 2009
INVENTOR(S) : Ide et al.

It is certified that error appears in the above-identified patent and that said Letters Patent is hereby corrected as shown below:

In Column 15:

At Table 1-1-continued, at the subheading "Other" at No. 34, after "Hf:0.15" please insert -- Y:0.02 --.

Signed and Sealed this

Sixth Day of October, 2009

David J. Kappos
*Director of the United States Patent and Trademark Office*